United States Patent [19]

Karstensen

[11] Patent Number: 5,416,624
[45] Date of Patent: May 16, 1995

[54] BIDIRECTIONAL OPTICAL TRANSMISSION AND RECEPTION ARRANGEMENT

[75] Inventor: Holger Karstensen, Hohenbrunn, Germany

[73] Assignee: Siemens Aktiengesellschaft, Munich, Germany

[21] Appl. No.: 229,586

[22] Filed: Apr. 19, 1994

[30] Foreign Application Priority Data

May 17, 1993 [DE] Germany .................. 43 16 492.7

[51] Int. Cl.[6] .................. H04B 10/24; H04B 10/00; H04J 14/02
[52] U.S. Cl. .................. 359/114; 359/152; 359/131; 359/163; 385/24; 385/33
[58] Field of Search ............ 359/113, 127, 128, 129, 359/130, 131, 152, 163, 114; 385/24, 31, 37, 33

[56] References Cited

U.S. PATENT DOCUMENTS

| | | | |
|---|---|---|---|
| 4,431,258 | 2/1984 | Fye | 385/24 |
| 4,474,424 | 10/1984 | Wagner | 385/24 |
| 4,625,333 | 11/1986 | Takezawa et al. | 359/152 |
| 4,693,544 | 9/1987 | Yamasaki et al. | 385/24 |
| 4,707,056 | 11/1987 | Bittner | 385/17 |
| 4,767,171 | 8/1988 | Keil et al. | 359/114 |
| 4,830,454 | 5/1989 | Karstensen | 350/96.18 |
| 4,989,934 | 2/1991 | Zavracky et al. | 359/152 |
| 5,066,090 | 11/1991 | Mayerhofer et al. | 385/35 |

FOREIGN PATENT DOCUMENTS

| | | | |
|---|---|---|---|
| 0238977 | 9/1987 | Europe | H04B/9/00 |
| 2-84605 | 3/1990 | Japan | G02B/6/42 |

OTHER PUBLICATIONS

Karstensen et al, "Linsenoptik für Lasermodule mit Monomode-Anschlussfaser", Siemens Forsch.-u. Entwickl.-Ber., vol. 16 (1987), No. 4, pp. 141-146.

Karstensen, "Laser Diode to Single-Mode Fiber Coupling with Ball Lenses", J. Opt. Commun., vol. 9, No. 2, 1988, pp. 42-49.

Karstensen et al, "High-Efficiency Two Lens Laser Diode to Single-Mode Fiber Coupler with a Silicon Plano Convex Lens", Journal of Lightwave Technology, vol. 7, No. 2, Feb. 1989, 244-249.

Karstensen et al, "Loss Analysis of Laser Diode to Single-Mode Fiber Couplers with Glass Spheres or Silicon Plano-Convex Lenses", Journal of Lightwave Technology, vol. 8, No. 5, May 1990, pp. 739-747.

Reith et al, "Relaxed-Tolerance Optoelectronic Device Packaging", Journal of Lightwave Technology, vol. 9, No. 4, Apr. 1991, pp. 477-484.

"Die Abbildungsfehler der Linsen", from Bergmann-Schaefer, Lehrbuch der Experimentalphysik, vol. 3 Optik, 7th Edition, Berlin 1978, pp. 102-117.

Chapter 6 "Edge Filters", from H. A. Macleod, Thin--film Optical Filters, Adam Hilger Ltd., Bristol, England, 1986, pp. 188-233.

Abstract of Japanese Published Application 60-60604 of April 8, 1985, Patent Abstracts of Japan, Vol. 9, No. 195 (P-379) [1918] August 13, 1985.

Abstract of Japanese Published Application 59-55408 of March 30, 1984, Patent Abstracts of Japan, Vol. 8, No. 151 (P-288) [1594] July 20, 1984.

Abstract of Japanese Published Application 2-84605 of March 26, 1990, Patent Abstracts of Japan, Vol. 14, No. 283 (P-1063) [4226] June 19, 1990.

Examiner—R. Bacares
Primary Examiner—David K. Moore
Assistant Examiner—Rafael Bacares
Attorney, Agent, or Firm—Hill, Steadman & Simpson

[57] ABSTRACT

A compact bidirectional transmission and reception arrangement has a planar convex lens having a separate filter on a planar surface of the lens. The lens is positioned between a transmitter and a receiver. The filter is not transmissive to a first wavelength emitted by the transmitter but is transmissive to a second wavelength which is received by the receiver. The lens and transmitter and receiver are arranged so that light of the first wavelength emitted by the transmitter is reflected by the planar surface of the lens to a spot and light coming from the spot will be passed through the lens to a window of the receiver.

9 Claims, 4 Drawing Sheets 2.5mm

BIDIRECTIONAL OPTICAL TRANSMISSION AND RECEPTION ARRANGEMENT

BACKGROUND OF THE INVENTION

The present invention is directed to an improvement in a bidirectional optical transmission and reception arrangement which includes an optical transmitter having a transmitter window for the emission of an optical radiation having a first wavelength, an optical receiver having a receiver window for the reception of an optical radiation having a second wavelength, an optical delivery arrangement for delivering the radiation having the first wavelength emitting from the transmitter window to a predetermined spatial point at a distance from the transmitter window and from the receiver window and for delivering the radiation having the second wavelength emitting from the spatial point to the receiver window, and an optical shielding arrangement for shielding the receiver window against the radiation having the first wavelength and for shielding the transmitter window against the radiation having the second wavelength.

A known bidirectional optical transmission and reception arrangement has an optical transmitter, which is a laser diode, and an optical receiver, which is a photodiode with a photodiode window. The optical delivery arrangement for the arrangement comprises two optical lenses. One of the lenses is for optically imaging a laser beam of the first wavelength emitting from the laser diode window on a specific spatial point at a distance from the laser window and the photodiode window and the other lens is for the optical imaging of the second wavelength emitting from the spatial point onto the photodiode window. The arrangement includes optical shielding means which is composed of a separate, wavelength-selective optical filter arranged obliquely in the beam path of the radiations of the two wavelengths, and this optical filter is non-transmissive for one of the two wavelengths and is only transmissive for the other of the two wavelengths.

SUMMARY OF THE INVENTION

The present invention is directed to the object of providing an improved bidirectional optical transmission and reception arrangement which can be constructed more compactly in comparison to present-day arrangements. The arrangement of the present invention is particularly useful for subscribers in a network.

This object is achieved by an improvement in a bidirectional optical transmission and reception arrangement which is composed of an optical transmitter having a transmitter window for the emission of an optical radiation having a first wavelength, an optical receiver having a receiver window for the reception of optical radiation having a second wavelength, an optical delivery means for delivering the radiation having the first wavelength emitting from the transmitter window to a predetermined spatial point at a distance from the transmitter window and from the receiver window and for delivering the radiation having the second wavelength emitting from the spatial point to the receiver window, and an optical shielding means for shielding the receiver window against the radiation having the first wavelength and for shielding the transmitter window against the radiation having the second wavelength.

The improvements are that the optical delivery means is composed of an optical lens having a planar lens face and a convex lens face; the transmitter, the receiver, the lens and the spatial point are spatially arranged relative to one another so that the axial ray of the radiation having the first wavelength emitted from the transmitter window is reflected at the planar lens face and the reflected axial ray proceeds to the spatial point and an axial ray of the radiation having the second wavelength emitted from the spatial point passes through the planar lens face of the lens and the axial ray that has passed through the lens face proceeds to the receiver window. The shielding means is composed of a wavelength-selective optical filter arranged on the planar lens face that is non-transmissive or reflective for the radiation of the first wavelength and is only transmissive for the radiation of the second wavelength.

Other advantages and features of the invention will be readily apparent from the following description of the preferred embodiments, the drawings and claims.

DESCRIPTION OF THE PREFERRED EMBODIMENTS

Figure 1:
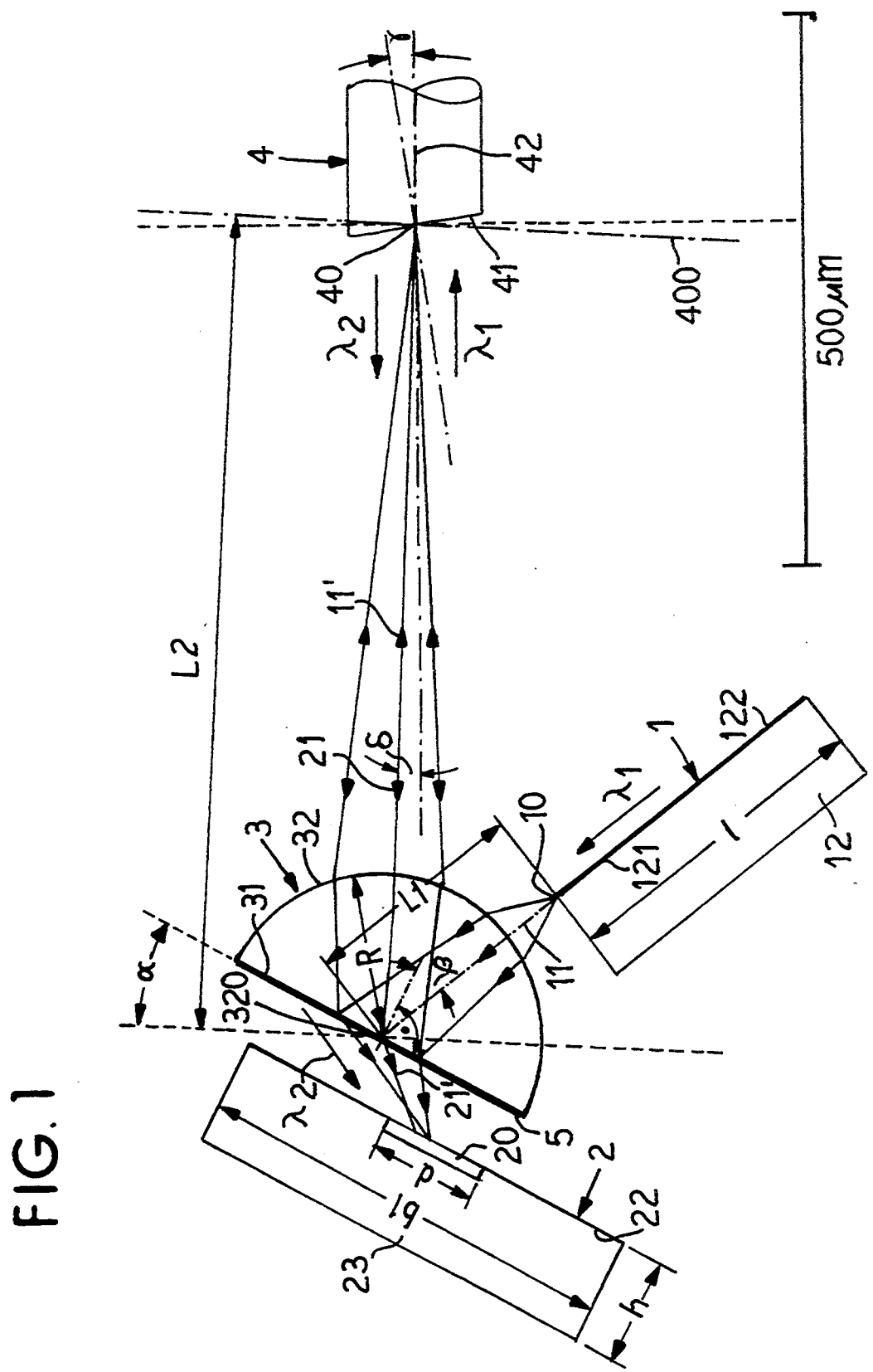
FIG. 1 is a schematic illustration of an exemplary embodiment of the present invention.

The principles of the present invention are particularly useful when incorporated in a bidirectional optical transmission and reception arrangement illustrated in FIG. 1. The arrangement of FIG. 1, as well as the arrangements of FIGS. 2–4, each comprise an optical transmitter, generally indicated at 1, having a transmission window 10 for emitting an optical radiation having the first wavelength $\lambda_1$, an optical receiver, generally indicated at 2, having a receiver window 20 for the reception of an optical radiation of the second wavelength $\lambda_2$, a lens, generally indicated at 3, having a planar lens face 31 and a convex lens face 32 and an optical filter 5 arranged on the planar lens face 31. In addition, a spatial point 40 at a distance from the transmitter window 10 and the receiver window 20 is allocated in common to these elements and is illustrated as being an end face of an optical fiber, generally indicated at 4.

The transmitter is preferably composed of a laser diode 2 having a strip-like optical waveguide 122 integrated on a surface 121 of a substrate 12 and contains optical-compatible material. The waveguide 122 comprises an end face 10 facing toward the lens 3 from which the laser emission having the first wavelength $\lambda_1$ emerges and which defines the transmitter window.

The receiver 2, for example, is a photodiode having a region 20 sensitive for the radiation having the second wavelength $\lambda_2$. This region 20 is constructed or fashioned either on or under a surface 22 of a substrate 23 and defines the receiver window.

The plano-convex lens 3 is preferably a hemispherical lens, for example, a lens having a planar, refractive lens face 31 and a convex refractive lens face 32 in the form of a hemispherical surface whose center 320 of curvature essentially lies on the planar lens face 31.

The filter 5 is preferably a dielectric multiple layer that, for example, can be produced by vapor-deposition of dielectric layers onto the planar lens face 31 and the filter characteristics are the same as that of a cut-off filter that is essentially non-transmissive or reflective for the radiation having the first wavelength $\lambda_1$ and is essentially completely transmissive for the radiation having the wavelength $\lambda_2$. What this filter 5 does is that the planar lens face 31 with the filter 5 is an ideal reflector for the radiation having the first wavelength $\lambda_1$ and is an anti-reflecting surface for the radiation having the second wavelength $\lambda_2$.

The spatial point 40 is not to be understood as being a mathematical point but is a specific, small spatial region whose dimensions, for example, lie on the order of magnitude of a transmitter window 10 and/or a receiver window 20. For example, the spatial point is defined by the end face of a core of an optical monomode fiber 4 whose diameter typically lies at 5 $\mu$m.

It is expediently, but not necessarily established, that in all exemplary embodiments, an axial beam 11 of the laser emission having the first wavelength $\lambda_1$ emitted divergently from the transmitter window 10 perpendicularly impinges the hemispherical, refractive lens face 32. Thus, the axial beam 11 will enter the lens 3 unrefracted, i.e., undeflected, and impinge the planar lens face 31 thereof obliquely at a predetermined incident angle $\beta$, as well as in the center 320 of the hemispherical lens face 32. As a consequence of the fact that the planar lens face 31 is an ideal reflector for this laser emission, the hemispherical, plano-convex lens 3 optically acts like a full spherical lens. This means that the reflected axial beam 11' will impinge perpendicularly on a tangent of the hemispherical convex lens face 32 so that it emerges from the lens in an unrefracted, i.e., undeflected, so that the transmitter window 10 is imaged on the reflected axial beam 11' in an allocated image plane 400. The spatial point 40 is preferably arranged in this image plane 400 so that it is impinged by the axial beam.

The radiation having the second wavelength $\lambda_2$ that is divergently emitted from the spatial point 40 is expediently directed onto the lens 3 with an axial ray 21 of this radiation perpendicularly impinges a tangent of the spherical, convex lens face 32 so that this axial ray enters into the lens 3 in an unrefracted, i.e., undeflected, manner. The ray 21 will impinge the planar lens face 31 at the center 320 of the hemispherical lens face 32. Since the filter 5 has an anti-reflecting effect for this radiation, this radiation emerges essentially completely from the lens 3 at this planar face 31 as a pass-through beam 21'. A certain reflection of this radiation at the planar face is not excessively disturbing and it only has the effect of an auxiliary attenuation, since the radiation having the second wavelength $\lambda_2$ hardly influences the laser diode 1.

With reference to the radiation having the second wavelength $\lambda_2$, the lens 3 acts like a plano-convex lens which images the spatial point 40 in an allocated image plane (not shown) on the axial ray 21' which has emerged from the planar lens face 31. The receiver window 20 is preferably arranged in this image plane so that it is impinged by the axial ray 21' that has emerged. The plane 22, on which the receiver window 20 is arranged, can be tilted relative to the image plane.

The radiation having the second wavelength $\lambda_2$ which passes through the planar lens face 41 is refracted dependent on the difference between the refractive index of the material of the lens 3 and the refractive index of the medium adjoining the filter 5.

Figure 2:
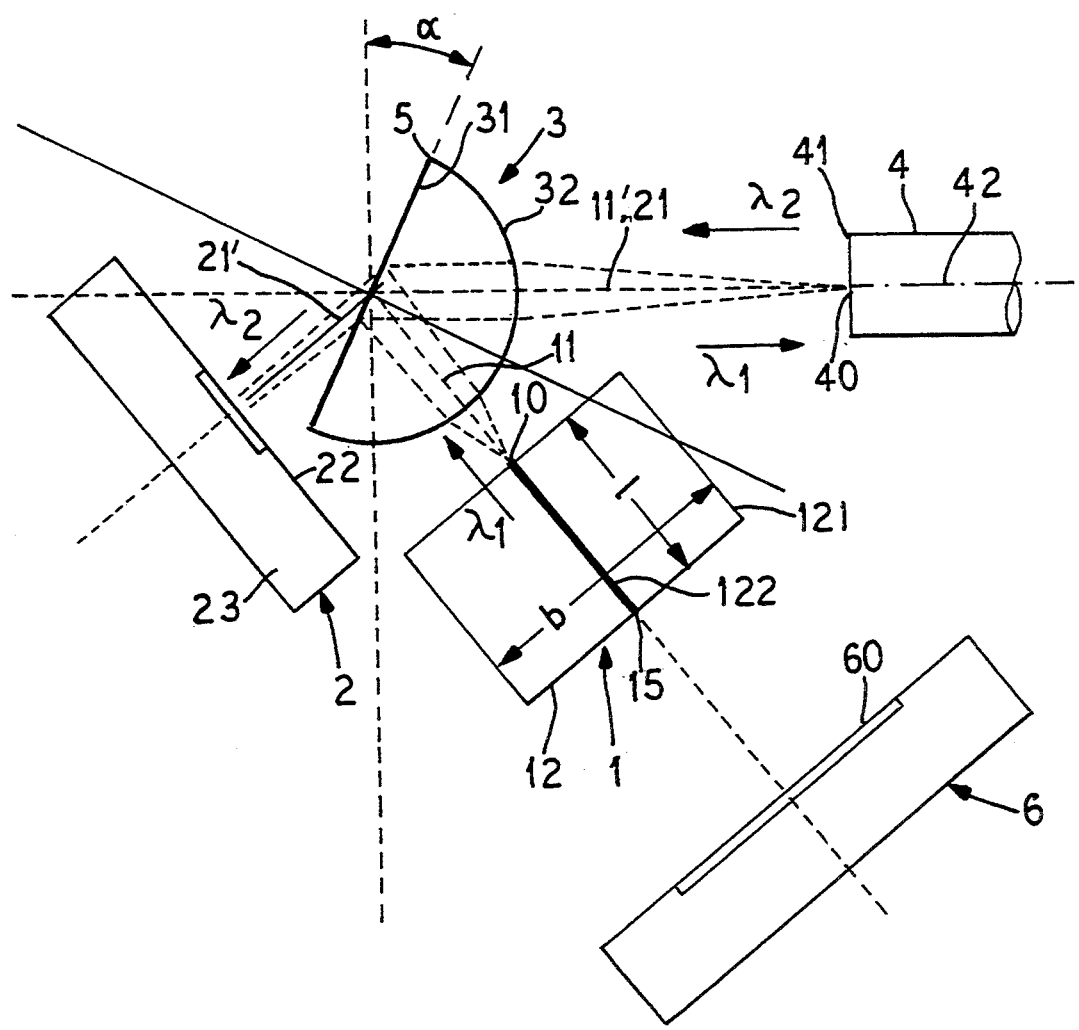
FIG. 2 is a schematic illustration of a second embodiment of the present invention.

A not particularly good imaging property of the plano-convex lens having the convex side toward the subject and the imaging error additionally occurring from the inclination of the lens relative to the optical axis is not especially disturbing when the spatial point 40 is defined by the core of a monomode fiber 4, since the optical imaging of the monomode fiber onto the photodiode is not critical, if only because of the relatively large photodiode window. Limitations for the maximum angle of inclination occur due to the refraction of the radiation having the second wavelength $\lambda_2$ at the planar end face 31 which is inclined relative to the supplied axial ray 21 or, respectively, relative to the reflected axial ray 11'. The refraction is all the higher the higher the refractive index of the lens relative to the surrounding medium. Thus, with a high refractive index for the lens, a better coupling between the laser diode and fiber 4 must be had and the maximum angle of inclination of the planar lens face 31 can be all the smaller. Given a suitable selection of all parameters, however, completely satisfactory results can be achieved. In FIGS. 1 and 2, the angle of inclination $\alpha$ of the planar lens face 31 in reference to a plane that is perpendicular to the axial ray 21 supplied from the spatial point 40 or, respectively, on the reflected ray 11' is illustrated.

In a specific example of FIG. 1, the lens 3 has a refractive index $n=1.75$ and the hemispherical, convex face 32 has a radius $R=150$ $\mu$m. The focal length of the lens amounts to 200 $\mu$m for the radiation having the second wavelength $\lambda_2$ for which it acts as a plano-convex lens and amounts to 175 $\mu$m for the radiation having the first wavelength $\lambda_1$ for which it acts as the spherical lens. The angle of inclination $\alpha$ is selected as 25°. The first wavelength $\lambda_1$ amounts to 1.3 $\mu$m and the radius of the transmitter window 10, which is the same as the spot radius of the laser diode, amounts to approximately 1 $\mu$m. The length l of the strip-shaped optical waveguide 122 of the laser diode 1, i.e., the channel length of the laser diode amounts to 300 $\mu$m and the width b (see FIG. 2) of the diode 1, likewise, amounts to 300 $\mu$m.

The photodiode 2 has a surface defining the receiver window 20 that is sensitive for the radiation of the second wavelength $\lambda_2$ that has a diameter d of 100 $\mu$m. The photodiode has a width b1 of 400 $\mu$m and a height or thickness h of 100 $\mu$m. A spacing L1 of the transmitter window 10 from the center 320 of the hemispherical, convex face 32 amounts to 210 $\mu$m and the spacing L2 of the center 320 from the image plane 400 is 750 $\mu$m.

The fiber 4 is a standard monomode fiber having a diameter of 125 $\mu$m and a spot width of 5 $\mu$m given $\lambda_1=1.3$ $\mu$m. The end face 41 of the fiber 4 facing toward the lens 3 is somewhat inclined relative to an axis 42 of the fiber 4 in order to avoid an end face reflection. This inclination is such that a surface normal of the end face 41 forms an angle $\gamma=7°$ with the axis 42 of the fiber 4. This angle $\gamma=7°$ is adequate for a sufficient suppression of the end face reflection.

The spatial point 40 is defined by the surface portion of the end face 41 which is associated with the core (not shown) of the fiber 4. As a consequence of the oblique positioning of the end face 41, the axis 42 of the fiber 4 and the axial rays 11' and 21 must be at an angle $\delta$ relative to one another which amounts to 3.2°. The scale for the horizontal direction indicated in FIG. 1 is also valid for the vertical direction.

In the arrangement of FIG. 1, the special characteristics are that the plane of the surface 121 of the substrate 12 of the laser diode 1 is arranged to extend perpendicular relative to the plane of the drawing in FIG. 1 and to the plane which is defined by the axial ray 11 having the first wavelength $\lambda_1$ that is emitted from the transmitter window 10 and by the reflected axial ray 11', which was reflected at the planar lens face 31 and proceeds to the spatial point 40. A plane defined by the surface 22 of the substrate 23 of the photodiode 2, which surface has the receiver window 20, is arranged to extend parallel to the planar lens face 31 which is also perpendicular to the plane of the drawing. Since the laser diode 1 and the photodiode 2 lie far apart, this special characteristic has an advantage for the purposes of construction.

An embodiment of the arrangement of FIG. 1 is shown in a simplified form in FIG. 2 and differs from the arrangement of FIG. 1 in that the surface 121 of the substrate 12 of the laser diode 1 is arranged parallel to the plane defined by the axial rays 11 and 11', which have the first wavelength $\lambda_1$. In other words, the surface 121 is arranged to extend parallel to the plane of the drawing. Also, the surface 22 of the substrate 23 of the photodiode 2 extends perpendicular relative to the plane of the drawing and is arranged obliquely at an angle relative to the planar lens face 31. In addition, a special characteristic that is not absolutely necessary is also presented in that the surface 22 is arranged perpendicular relative to the axial ray 21' having the second wavelength 2 that has passed through the lens 3. For the sake of simplicity, the end face 41 of the fiber 4 which is, in fact, oblique, as in FIG. 1, is not shown obliquely relative to the axis 42.

FIG. 2 also shows a monitor diode 6 which is, likewise, present in the arrangement of FIG. 1, but which was omitted in this Figure for the sake of simplicity. The monitor diode will serve the purpose of monitoring the laser diode 1. The monitor diode comprises a light-sensitive region 60 that receives radiation having the first wavelength $\lambda_1$ from the laser diode 1. This radiation emerges from an end face 15 of the strip-shaped waveguide 121 of the laser diode 21 that faces away from the transmitter window 10.

It can be very advantageous for construction-related reasons to obtain the transmitter 1 and the lens 3 or the receiver 2 and the lens 3 as a sub-assembly. This is true both for the arrangement of FIG. 1 as well as for the embodiment of FIG. 2. In particular, a sub-assembly composed of a receiver 2 and a lens 3 is advantageous, since these two components are relatively insensitive and one need only count on a few rejects in the manufacturing process of such a sub-assembly. In addition, the required assembly precision of the two components relative to one another is not critical.

Figure 3:
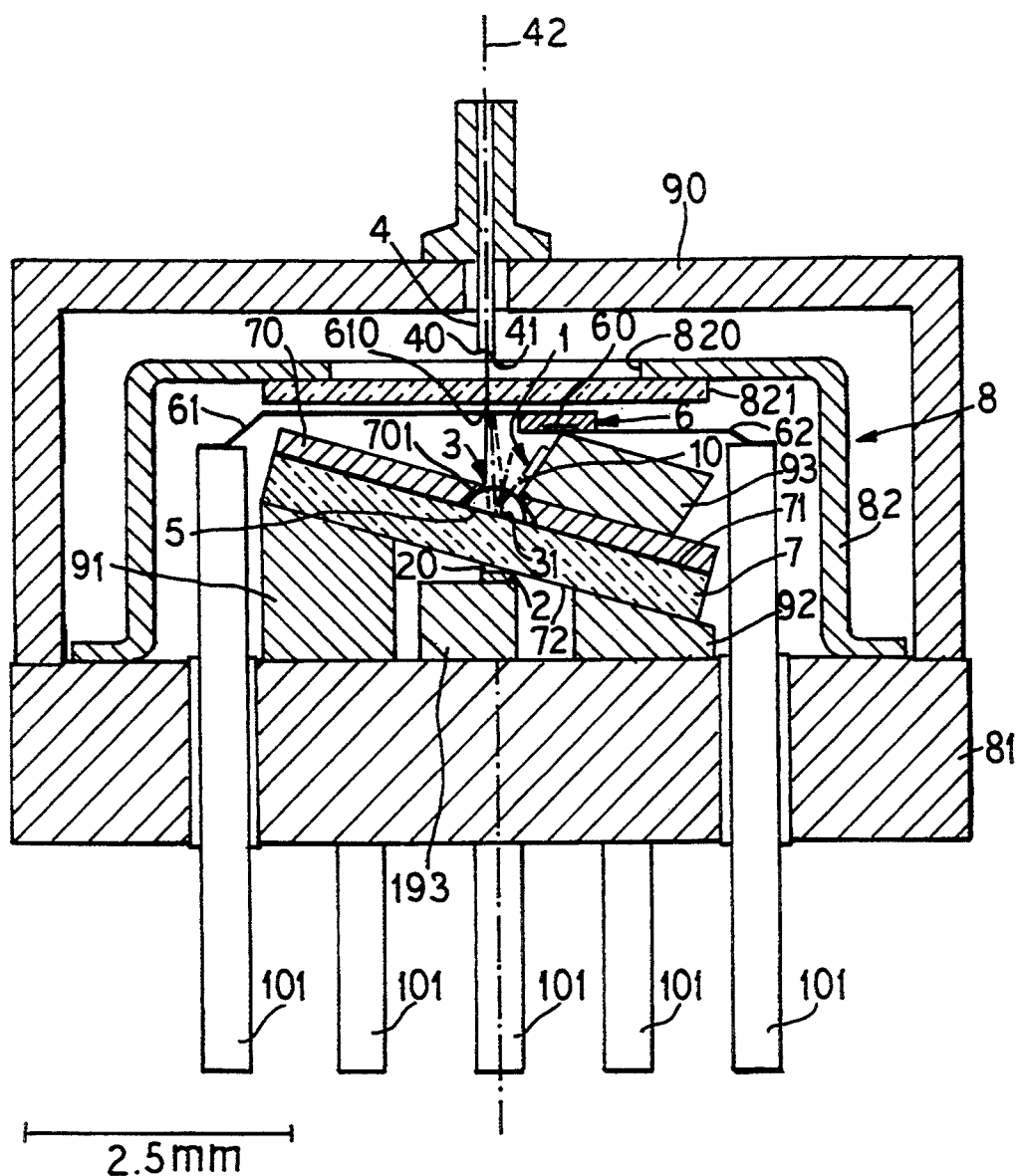
FIG. 3 is a cross sectional illustration of a bidirectional module having a third embodiment of the present invention.

In FIG. 3, a true-to-scale arrangement or embodiment is shown in a longitudinal cross sectional view with reference to the axis 42 for the fiber 4 and the lens 3 is secured to a plate 7 that is transparent for the radiation having the second wavelength $\lambda_2$. The planar end face 31 will face toward a first planar surface 71 of this plate 7 so that the filter 5 is located between this first planar surface 71 of the plate 7 and the planar lens face 31. The receiver is arranged relative to a second planar surface 72 of the plate 7 that faces away from the first planar surface 71 of the plate through which the radiation having the second wavelength $\lambda_2$ has passed through the planar lens face 31, through the filter 5 and through the planar plate 7 and emerges from the second planar surface 72 of the plate 7 to proceed to the receiver window 20 of the receiver.

The plate 7 is supported by two pedestals 91 and 92, which are arranged at a distance from one another and are preferably composed of metal. The pedestals are supported on a housing floor 81 of a housing, generally indicated at 8. The pedestals 91 and 92 support the plate 7 with the second planar surface 72 facing toward the housing floor 81 and at a distance from this floor. The receiver 2 is supported on the housing floor 81 by a pedestal 193 which is preferably metal and is positioned between the pedestals 91 and 92 and is arranged between the plate 7 and the housing floor 81. The transmitter is supported adjacent the first planar surface 71 and, as illustrated, is mounted on a pedestal 93 which is secured to a second plate 70 that is mounted on the first surface 71 and has an opening so that it can surround the lens 3. The transmitter and the lens 3 form a sub-unit in the present construction.

The plate 7, the lens 3, the filter 5, the transmitter 1 and the receiver 2 are covered by a cap-shaped housing cover 82 of the housing 8 which can be either permanently or detachably connected to the housing floor 81. The cover 82 is preferably composed of metal and has a window opening 820 for an undisturbed passage of the radiation having the first wavelength $\lambda_1$ and the radiation having the second wavelength $\lambda_2$.

The fiber 4 is held in a flange 90 that lies against the housing floor 81 and holds the end face 41 of the fiber 42 in the region of the window opening 820 of the housing cover 82. Thus, the radiation of the first wavelength $\lambda_1$ emitted from the transmitter window 10 will be imaged onto the end face 41 of the fiber 4 by the lens 3 at the spatial point 40 and the radiation of the second wavelength $\lambda_2$ emitted from the fiber at the spatial point 40 will be imaged onto the receiver window 20 of the receiver 2 by the lens 3. Pin-shaped, electrical terminals are referenced 101, and these will project through the housing floor 81 into the inside of the housing 8 and serve the purpose of electrical contacting of the electrical circuits and components inside of the housing. The monitoring diode 6 having the light-sensitive region 60 is also included among these and is held by contact strips 61 and 62 connected to two of the terminals 101. The one contact strip 61 thereof has a window opening 610 for the undisturbed passage of the radiation having the first wavelength $\lambda_1$ and of the radiation having the second wavelength $\lambda_2$.

In order to avoid the penetration of foreign bodies into the inside of the housing 8 through the window opening 820 of the housing cover 82, the window opening 820 is closed by a plate 821 which is transparent for the radiation having the first wavelength $\lambda_1$ and for the radiation having the second wavelength $\lambda_2$. Preferably, the plate 821 is provided with an anti-reflection coating.

In a specific embodiment, the lens 3 is fabricated of a material having a refractive index n=1.75. The radius of the spherical convex face 32 of the lens 3 amounts to 350 μm. This corresponds to a focal length of 333 μm for the radiation having the second wavelength $\lambda_2 = 1.55$ μm and for the focal length of 2.92 μm for the radiation having the first wavelength $\lambda_1 = 1.3$ μm. The angle a in the arrangement of FIG. 3 is selected equal to 20°. The dimensions of the laser diode 1 are the same as in the arrangement of FIG. 1. The dimensions of the photodiode 2 differ from the arrangement according to FIG. 1 only on the basis of the different width $b_1$ of 250 μm. The fiber 4 is identical to the fiber 4 of FIG. 1. The plate 7 and the second plate 70 are both composed of silicon.

The terminals 101, of which a total of eight are provided and of which only five can be seen in FIG. 3, are arranged around the axis 42 of the fiber 4 and are placed so that optimally good RF shielding is achieved between the transmitter 1, the receiver 2 and monitor diode 6. To that end, three terminals are applied to ground and an additional terminal is applied to a bias of the receiver 2 that, likewise, lies at ground in terms of radio frequency.

The module of FIG. 3 allows a nearly complete metallic encapsulation of the receiver 2 and, thus, allows an extremely good electrical shielding of the reception part. The optical cross-talk between transmitter 1 and receiver 2 can be nearly completely suppressed by a dexterously designed metallization of the second plate 70. The scale for the horizontal direction indicated in FIG. 3 is also valid for the vertical direction.

Figure 4:
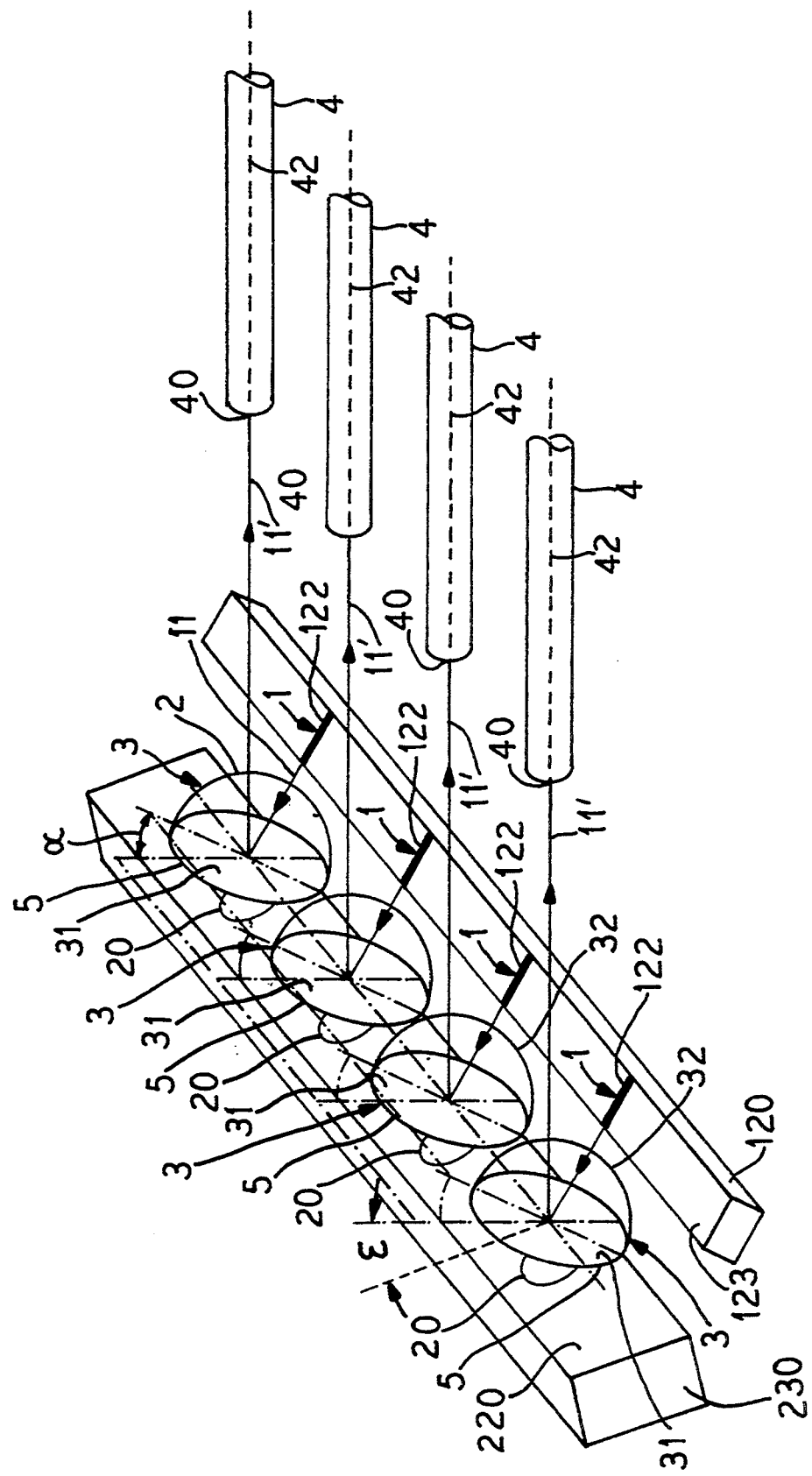
FIG. 4 is a schematic illustration of an array of arrangements in accordance with the present invention.

The array of the inventive arrangement shown in FIG. 4 is constructed with an arrangement wherein the strip-like waveguides 122 of the laser diode 1 are arranged in a plane 123 that, similar to the surface 121 of the substrate 12 of the laser diode 1 in the arrangement of FIG. 1, resides perpendicularly relative to the plane of the plane created by the axial ray 11 having the first wavelength $\lambda_1$ that is emitted from the transmitter window 10 and the reflected axial ray 11', and this plane is the same plane as the plane of the drawing of FIG. 1. The laser diodes 1 can be advantageously fashioned as line-shaped laser diode arrays that are simple to manufacture on a surface forming the plane 123 of the substrate 120 shared in common by all diodes 1.

Similarly, the photodiodes 2 can be advantageously fashioned or constructed as line-shaped photodiode arrays that are simple to manufacture on a surface 220 of a substrate 230 shared in common by all the photodiodes 2. The surface 220 forms the plane wherein the receiver windows 20 of the photodiodes are arranged, and whereby this plane 220 in FIG. 4 is inclined, for example, obliquely at an angle $\epsilon$ relative to a plane on which the planar lens faces 31 of all the lenses are arranged. The axial ray 21 having the second wavelength $\lambda_2$ which coincides between the planar lens faces 31 and the spatial point 40 with the axial ray 11' reflected by the planar lens faces 31 and proceeds to the spatial point 40 is not shown in FIG. 4 for the sake of clarity. The fibers 4 which are allocated to the individual arrangements which are each composed of a laser diode 1, a photodiode 2 and lens 3 can also be advantageously fashioned in the form of a fiber array, wherein the fibers are arranged parallel side-by-side in a common plane.

The monomode fibers 4 employed in the exemplary embodiments can also be multimode fibers.

A plano-convex rod lens can also be used instead of the hemispherical lens 3. The radius of the convex lens face of this rod lens is smaller than the length of the rod. This lens dare not be excessively long or the refractive index thereof dare not be excessively high, since the focal point of the lens and possible the image plane onto which the specific spatial point is imaged by the radiation having the second wavelength $\lambda_2$ otherwise will possibly lie within the lens. The rod lens acts like a biconvex lens with reference to the radiation having the first wavelength $\lambda_1$ and acts like a thick plano-convex lens with reference to the radiation having the second wavelength $\lambda_2$.

The lens 3 can also be a thin, plano-convex lens, whereby the convex lens face is not a hemisphere but only a spherical cap. The thickness of this lens is less than the radius of the spherical cap. Such a lens acts like a biconvex lens with reference to the radiation having the first wavelength $\lambda_1$ and acts like a thin plano-convex lens with reference to the radiation having the second wavelength $\lambda_2$. Higher refractive indexes are possible given this type of lens.

Apart from the monitor receiver, an arrangement of the invention advantageously requires only three optical or, respectively, opto-electrical components which are the optical transmitter, the plano-convex lens, whose planar lens face is reflective for one of the two wavelengths and is transmissive for the other, and an optical receiver. A second lens and a separate wavelength filter together with the assembly and adjustment costs thereof are eliminated. This structure can be so compactly designed that the entire module, except for the fibers or, respectively, fiber plug, can be accommodated in a TO housing or a TO-like housing. Moreover, the arrangement of the invention is advantageously capable of being arranged in an array so that the multichannels, bidirectional modules for fiber arrays can also be realized with the arrangement of this invention.

Although various minor modifications may be suggested by those versed in the art, it should be understood that I wish to embody within the scope of the patent granted hereon all such modifications as reasonably and properly come within the scope of my contribution to the art.

I claim:

1. In a bidirectional optical transmission and reception arrangement comprising an optical transmitter having a transmitter window for the emission of an optical radiation having a first wavelength, an optical receiver having a receiver window for the reception of optical radiation having a second wavelength, an optical delivery means for delivering the radiation having the first wavelength emitted from the transmitter window to a predetermined spatial point at a distance from the transmitter window and from the receiver window and for delivering radiation having a second wavelength emitted from the spatial point to the receiver window, and an optical shielding means for shielding the receiver window against the radiation having the first wavelength and for shielding the transmitter window against radiation having the second wavelength, the improvements comprising the optical delivery means being an optical lens having a planar lens face and a convex lens face, said transmitter, receiver, lens and spatial point being spatially arranged relative to one another so that the axial ray of the radiation having the first wavelength emitted from the transmitter window is reflected by the planar lens face to form a reflected axial ray proceeding to the spatial point and an axial ray of the radiation having the second wavelength emitted from the spatial point passes through the planar lens face of the lens to form a passed-through axial ray which proceeds to the receiver window, and said shielding means being a wavelength-selective optical filter arranged on the planar lens face that is non-transmissive for the first wavelength and is only transmissive for the second wavelength.

2. In a bidirectional optical transmission and reception arrangement according to claim 1, wherein the convex lens face is part of a spherical surface whose center essentially lies in the planar lens face and the transmitter, receiver, lens and spatial point are arranged relative to one another so that the axial ray having the first wavelength emitted from the transmitter window and the radial axial ray having the second wavelength emitted from the spatial point each, respectively, perpendicularly impinge the spherical, convex lens face.

3. In a bidirectional optical transmission and reception arrangement according to claim 2, wherein the optical transmitter is composed of a laser diode having a strip-shaped optical waveguide integrated on a surface of a substrate containing a laser-capable material, said strip-shaped optical waveguide comprising an end face that faces toward the lens and defines the transmitter window.

4. In a bidirectional optical transmission and reception arrangement according to claim 3, wherein the surface of the substrate is arranged to extend perpendicular relative to the plane defined by the axial ray having the first wavelength that is emitted from the transmitter window and a reflected axial ray, which is reflected by the planar lens face.

5. In a bidirectional optical transmission and reception arrangement according to claim 1, wherein the receiver window is arranged in a plane that is parallel to the planar lens face and is inclined relative to the axial ray having the second wavelength that has passed through the planar lens face.

6. In a bidirectional optical transmission and reception arrangement according to claim 1, wherein the receiver window is arranged in a plane that extends perpendicular relative to the axial ray having the second wavelength that has passed through the planar lens face.

7. In a bidirectional optical transmission and reception arrangement according to claim 1, wherein the receiver window is arranged at an angle both relative to the planar lens face as well as relative to the plane extending perpendicular to the axial ray having the second wavelength that has passed through the planar lens face.

8. In a bidirectional optical transmission and reception arrangement according to claim 1, wherein the lens is secured to a plate that is transparent for radiation having the second wavelength, said lens being mounted with the planar lens face facing toward a first planar surface of said plate and the filter being located between said first surface of the plate and the planar end face, the receiver being arranged relative to a second planar surface of the plate facing away from the first planar surface of the plate so that the radiation having the second wavelength will pass through the planar lens face through the filter and through the transparent plate and emerge from the second planar surface of the plate to proceed to the receiver window.

9. In a bidirectional optical transmission and reception arrangement according to claim 8, wherein the plate is supported on a housing floor of a housing with the second planar surface of the plate facing toward the housing floor and the plate is at a distance from said floor, the receiver is arranged on the housing floor and supported between the housing floor and the plate, the transmitter is arranged adjacent the first planar surface of the plate and the plate, the lens, the filter, transmitter and receiver are covered by a housing cover of the housing which is connected to the housing floor, said housing cover having a window opening for the passage of radiation having the first wavelength and radiation having the second wavelength.

* * * * *